United States Patent
Sonobe

(10) Patent No.: US 8,098,501 B2
(45) Date of Patent: Jan. 17, 2012

(54) SWITCHING POWER SUPPLY CONTROL CIRCUIT

(75) Inventor: Koji Sonobe, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 268 days.

(21) Appl. No.: 12/607,664

(22) Filed: Oct. 28, 2009

(65) Prior Publication Data

US 2010/0135050 A1    Jun. 3, 2010

(30) Foreign Application Priority Data

Oct. 28, 2008    (JP) .................. 2008-276776

(51) Int. Cl.
*H02M 3/335* (2006.01)
*G05F 1/575* (2006.01)

(52) U.S. Cl. .................... 363/21.01; 363/17; 363/21.07; 323/284; 323/285

(58) Field of Classification Search .................. 323/284, 323/285, 351; 363/17, 20, 21.01, 21.07, 363/21.15, 97

See application file for complete search history.

(56) References Cited

U.S. PATENT DOCUMENTS

| | | | |
|---|---|---|---|
| 5,905,491 A * | 5/1999 | Kim ................................ | 345/212 |
| 6,252,783 B1 * | 6/2001 | Huh et al. .................... | 363/21.01 |
| 6,295,217 B1 * | 9/2001 | Yang et al. ....................... | 363/49 |
| 6,392,906 B2 * | 5/2002 | L'Hermite et al. ............. | 363/97 |
| 7,218,532 B2 * | 5/2007 | Choi et al. ................. | 363/21.01 |
| 7,529,105 B1 * | 5/2009 | Choi et al. ........................ | 363/97 |

FOREIGN PATENT DOCUMENTS

| | | | |
|---|---|---|---|
| JP | 2001-086745 A | 3/2001 |
| JP | 2002-044942 A | 2/2002 |
| JP | 2003-319655 A | 11/2003 |

* cited by examiner

*Primary Examiner* — Gary L Laxton
(74) *Attorney, Agent, or Firm* — Rossi, Kimms & McDowell LLP

(57) ABSTRACT

A comparator detects whether a feedback signal of an output voltage detecting circuit for a switching power supply circuit reaches a control voltage. A comparator detects an operating state of the switching power supply circuit, which is instructed by a switching instruction signal, by comparing the instruction signal with a reference voltage. The comparators are connected to a decision circuit which outputs to a control circuit a signal instructing a normal state until the feedback signal reaches the control voltage, and thereafter a signal instructing a normal state or a stand-by state that is instructed by the switching instruction signal. Thus, the control circuit makes the switching power supply circuit operate in a normal state until the output voltage reaches the control voltage. After the output voltage reaches the control voltage, the switching power supply circuit operated in an operation state instructed by the switching instruction signal to enable stable startup.

6 Claims, 9 Drawing Sheets

SWITCHING POWER SUPPLY CONTROL CIRCUIT

BACKGROUND OF THE INVENTION

The present invention relates to a switching power supply control circuit and more particularly to a switching power supply control circuit that operates a switching power supply system by switching its state between a normal state and a stand-by state.

At present, a switching power supply system that supplies power to various kinds of electric devices generally supplies power in two modes, a normal mode in which electric devices as objects of supplying electric power are made to carry out normal operations and a stand-by mode in which the electric devices are brought into stand-by states.

FIG. 6 is a circuit diagram showing an example of a switching power supply circuit forming a switching power supply system. The switching power supply circuit of the example shown in FIG. 6 is formed of two stages of a first converter 10 and a second converter 20. The first converter 10 is a PFC (Power Factor Control) step-up converter in which a PFC circuit 11 controls a switching device to step-up a full-wave rectified AC input voltage to convert it to a DC voltage. The output of the first converter 10 becomes an input to the second converter 20. The second converter 20 is a DC to DC converter which is shown here as an example of a half-bridge current resonance converter here. The second converter 20 supplies energy onto the output side through an insulating transformer.

In the second converter 20, the current in a light emitting element 24 in a photo coupler PC1 varies according to an output voltage. A photo-signal emitted from the light emitting element 24 in the photo coupler PC1 is detected by a photo-detector 22 in the photo coupler PC1 to be a feedback voltage (an FB terminal voltage) to a control IC 21 provided in the second converter 20. The electric potential of the FB terminal of the control IC 21 is pulled-up to a high potential side by an element such as a pull-up resistor not shown. The control IC 21 has a VCO (Voltage Controlled Oscillator) 21a, a control unit 21b and a starting circuit (START) 21c. The VCO 21a and the control unit 21b of them are provided in a switching power supply control circuit (not shown here) forming a part of the control IC 21. The switching power supply control circuit will be explained later. According to the variation in the FB terminal voltage, the oscillation frequency of the VCO 21a, connected to the FB terminal in the control IC 21, is made varied, by which control is carried out so that an output voltage of the switching power supply circuit is made constant. The START 21c is connected to the output side of the first converter 10 through a VH terminal and has a function of clamping a VCC voltage, supplied by rectifying and smoothing the output voltage of an auxiliary winding of the insulating transformer, at a specified voltage of Vsus by a current supplied from the VH terminal as a measure for stopping reduction in the VCC voltage. The second converter 20 is a current resonance type converter and energy which the second converter 20 can supply to the output side depends on the voltage applied across a resonance capacitor Cr. Hence, when the output voltage of the first converter 10 is low, an amount of the energy which the second converter 20 can supply to the output side is restricted.

Switching between an operating state in a normal mode and that in a stand-by mode is carried out according to instructions outputted from a stand-by instruction circuit 30 operated by another power supply such as a battery. The stand-by instruction circuit 30 ordinarily instructs a normal mode for a rated load (heavy load) by a high potential signal (hereinafter referred to as "H signal") and instructs a stand-by mode for a light load by a low potential signal (hereinafter referred to as "L signal"). In the normal mode, a light emitting element 25 in a photo coupler PC2 is made turned on. While, in the stand-by mode, the light emitting element 25 in the photo coupler PC2 is made turned off. The reason for making the light emitting element 25 in the photo coupler PC2 turned off in the stand-by mode is for reducing power consumption in the stand-by mode. The light signal emitted from the light emitting element 25 in the photo coupler PC2 is received by the photodetector 23 in the photo coupler PC2 to be transmitted to the control IC 21 via an STB terminal. The control IC 21 carries out switching of the operating states according to the voltage at the STB terminal.

At the operation in a stand-by mode, for reducing the power consumption in the stand-by mode, the switching operation of the first converter 10 is further made stopped. While, the second converter 20 is made to carry out an intermittent operation or carry out control such as PFM (Pulse Frequency Modulation) control or PWM (Pulse Width Modulation) control with a low frequency to reduce a switching loss. The operation and termination of the switching of the first converter 10 are switched by an inner stand-by signal outputted from a PFC_EN terminal of the control IC 21 in the second converter 20.

In this way, a signal for the feedback of an output voltage detecting signal and an instruction signal for switching operation modes are respectively transmitted by using different photo couplers.

Thus, there is proposed a switching power supply system in which a feedback signal of an output voltage detection signal and instruction signals for switching between operation modes are transmitted by one photo coupler (JP-A-2001-86745, for example). In such a switching power supply system, an output signal of the photo coupler is used as a feedback signal of an output voltage detection signal in a normal mode. When an instruction is given for switching from a normal mode to a stand-by mode, a shunt regulator connected to the photo coupler for controlling an amount of light emission is made short-circuited to force the photo coupler to emit light with the maximum amount. The sate is equivalent to a state with an abnormally high output voltage, in response to which the state of the system is made to transfer from the normal state into a stand-by mode.

Moreover, there is proposed a switching power supply system in which two photo couplers are provided for controlling an output voltage and for instructing switching between a normal mode and a stand-by mode, respectively. In the switching power supply system, the photo coupler for instructing switching between a normal mode and a stand-by mode has a collector of a phototransistor on the primary side connected to a half-wave rectifier circuit (see JP-A-2002-44942, for example). This makes a switching device turned-off as being in a stand-by mode only in a period in which a voltage from the half-wave rectifier circuit is applied to the collector of the phototransistor to permit power consumption reduction in the stand-by mode. For bringing the system into a stand-by mode, the phototransistor on the primary side in the photo coupler for instructing switching between a normal mode and a stand-by mode must be made turned-on. For this purpose, also in this case, the photo coupler for instructing switching between a normal mode and a stand-by mode must be forced to emit light with a large amount.

Here, a switching power supply control circuit forming a part of the control IC 21 will be explained. FIG. 7 is a circuit diagram showing an example of a related switching power supply control circuit. In FIG. 7, double circles in FIG. 7 represent input and output terminals. Signs attached to the input and out terminals correspond to those attached to input and output lines of the control IC 21 shown in FIG. 6. The FB terminal, the STB terminal, and OUTH and OUTL terminals are terminals for a feedback signal of an output voltage detection signal, an instruction input signal instructing an operation mode and output signals corresponding to instructed operation modes, respectively. A switching power supply control circuit 90 has a comparator 91, a VCO 92 controlling a switching power supply, and a control unit 93. The VCO 92 and the control unit 93 correspond to the VCO 21a and the control unit 21b, respectively, which are shown in FIG. 6. The comparator 91 compares the voltage of an instruction input signal inputted from the STB terminal with a specified operation mode decision reference voltage VthSTB. In general, the voltage of an instruction input signal for a normal operation mode is made higher than the VthSTB, while the voltage of an instruction input signal for a stand-by mode is made lower than the VthSTB. The comparator 91 outputs an H signal in the normal mode and an L signal in the stand-by mode to the control unit 93. The VCO 92 varies an oscillation frequency according to a feedback signal inputted from the FB terminal. The control unit 93 determines an operation according to the output signal of the comparator 91 to output switching signals based on the output of the VCO 92 from the OUTH terminal and the OUTL terminal in a normal mode and output signals for stopping a switching operation from the OUTH terminal and the OUTL terminal in a stand-by mode.

In general, there are two kinds of operation modes for starting up operation modes when starting up a switching power supply system by turning-on a power supply switch, a stand-by starting up mode and a rated load starting up (heavy load starting up) mode. In the related switching power supply system, however, there was a problem that the system sometimes can not be brought into operation in a normal mode after being made to start up in either one of the two kinds of modes.

The stand-by starting up mode is a mode in which a switching power supply system is made to start up in a stand-by mode with a light load when a main power supply is turned-on. After the system is made to start up in the stand-by starting up mode, when it is detected that a normal mode is instructed by an instruction input signal, the operation mode is made switched to the normal mode with a rated load.

The rated load starting up mode is a mode in which a switching power supply system is made to start up in a normal mode with a rated load. Here, an operation sequence in the stand-by starting up mode will be explained. FIG. 8 is a diagram showing variations with time in voltages and currents at various positions in a switching power supply circuit provided with the related switching power supply control circuit 90 shown in FIG. 7 in a starting up operation state in the stand-by starting up mode.

Turning-on of a main power supply at a time t1 results in an increase in a VCC voltage inputted to the control IC 21 shown in FIG. 6 by the operation of the START 21c in the control IC 21. The increased VCC voltage reaches a UVLO (Under Voltage Lock Out) on-voltage (VCCON) at a time t2. With the VCC voltage reached the UVLO on-voltage, the control IC 21 starts its switching operation. Because of the starting up operation mode being the stand-by starting up mode, at the time t2, the stand-by instruction circuit 30 outputs an L signal, by which the light emitting element 25 in the photo coupler PC2 is made turned-off. Therefore, the photodetector 23 in the photo coupler PC2 is not operated to be also made turned-off to cause the voltage at the STB terminal of the control IC 21 to be also in the state of the L signal. Thus, the switching operation of the second converter 20 is made started from a state in the stand-by mode. Since the operation is in the stand-by mode, the first converter 10 is in a state with its switching operation being stopped. The switching operation made started by the control IC 21 increases current consumption (stand-by current) to once reduce the VCC voltage. However, because of an electrical supply started thereafter from an auxiliary winding of the insulating transformer shown in FIG. 6, the VCC voltage increases again. This also increases the output voltage of the second converter 20 to make the voltage exceed a voltage that enables the photo couplers to be turned-on. At a time t3 at which the second converter 20 is brought into this state, the output of the stand-by instruction circuit 30 is switched to an H signal, by which switching from the stand-by mode to a normal mode is instructed. This makes the light emitting element 25 in the photo coupler PC2 turned-on to make the photodetector 23 in the photo coupler PC2 turned-on to bring the voltage at the STB terminal also exceeds the operation mode decision reference voltage VthSTB. Then, the control IC 21 switches the mode of the switching operation of the second converter 20 from the stand-by mode to a normal mode to further start the switching operation of the first converter 10. A resulting increase in the output voltage of the first converter 10 enables the second converter 20 to supply a rated load current, which increases the output voltage of the second converter 20 up to a control voltage to be made stabilized.

Next to this, an operation sequence in a rated load starting up mode will be explained. FIG. 9 is a diagram showing variations with time in voltages and currents at various positions in a switching power supply circuit provided with the related switching power supply control circuit 90 shown in FIG. 7 in a starting up operation state in the rated load starting up mode. The operation in the period from the time t1 at which the main power supply is turned-on to the time t2 at which the VCC voltage reaches the VCCON is the same as that in the stand-by starting mode shown in FIG. 8. Because of the rated load starting up mode, at the time t2, the output of the stand-by instruction circuit 30 is given as an H signal. However, the low output voltage of the second converter 20 makes the light emitting element 25 in the photo coupler PC2 impossible to be turned-on. This also makes the photodetector 23 in the photo coupler PC2 impossible to be turned-on to cause the voltage at the STB terminal in the control IC 21 to be provided as an L signal. As a result, the mode of the switching operation of the second converter 20 becomes a stand-by mode, in which an inner stand-by signal of stopping the switching operation of the first converter 10 is outputted from the PFC_EN terminal of the control IC 21. From the first converter 10 with its switching operation being thus made stopped, no increased voltage is supplied to the second converter 20. Therefore, no sufficient energy (current) can be supplied onto the output side of the second converter 20. At this time, the switching power supply circuit, being in a state with a rated load, allows no output voltage to be made increased when its load current is larger than the output current that can be supplied by the second converter 20. Once the switching power supply circuit enters in the state, although the stand-by instruction circuit 30 is outputting an H signal, the light emitting element 25 in the photo coupler PC2 can not be made turned-on to make the switching power supply circuit impossible to return from the stand-by mode to a normal mode. In FIG. 9, the reason that the VCC voltage is held at a voltage Vsus is due to the function of a clamp circuit in the START 21c in the control IC21.

Thus, there is a problem in that presence of a load being heavy to some extent from the beginning as in the rated load starting up mode makes at turning-on of the power supply the switching power supply circuit caught in a vicious cycle of causing no output voltage to be increased, enabling next no photo coupler to be turned-on, making then the switching power supply circuit brought in no normal operation mode (no rated load condition) and thus causing no output voltage to be increased.

Letting a state in which the photo couplers are made turned-off be a state in the normal operation mode, the switching power supply circuit can be brought into the normal operation mode even at turning-on of the power supply. In this case, however, photo couplers must be made turned-on in a stand-by mode. Thus, the charges in an output capacitor are consumed in the turned-on photo couplers, which consumption gradually reduces the output voltage. This makes it impossible for the switching power supply circuit to maintain the state in the stand-by mode for a long time. The same is true for the case of forcing a photo coupler to emit light when an instruction is given to switch the mode to the stand-by mode as in the invention disclosed in each of JP-A-2001-86745 and JP-A-2002-44942. In each of the inventions, a photo coupler is made to emit light so that a control circuit is to detect an output voltage as being in an abnormally high state, by which the converters are not operated. This causes no charges to be supplied to the output capacitor at all to lead to remarkable reduction in the output voltage when the state in the stand-by mode is made prolonged. Thus, there is a possibility of making a photo coupler impossible to be forced to emit light to make the switching power supply circuit impossible to maintain a state in the stand-by mode or impossible to drive a load when the stand-by mode is cancelled.

The same problem arises even though a switching power supply system is one formed of one converter (such as a flyback power supply, for example) rather than one formed of two stage converters as shown in FIG. 6. That is, in the case where the converter is one that carries out a stop of its switching operation, an intermittent operation or PFM control at a low frequency when in a stand-by state, since the output current of the converter is limited in a stand-by mode, when a load current is larger than the current which can be supplied by the converter once brought into the stand-by mode at the start up in a rated load start up mode, the same defect as above is caused.

The invention was made in view of such points with an object of providing a switching power supply control circuit which can stably start up with an instructed mode at turning-on of a power supply.

SUMMARY OF THE INVENTION

A switching power supply control circuit is provided which operates a switching power supply circuit with the power supply circuit switched into a normal state or a stand-by state. The switching power supply control circuit has:

a first comparator which has a feedback signal of an output voltage detecting circuit inputted to compare the inputted feedback signal with a feedback reference voltage corresponding to a specified control voltage, the detecting circuit detecting an output voltage of the switching power supply circuit, and outputs a voltage decision signal indicating whether the output voltage of the switching power supply circuit reaches the specified control voltage or not;

a second comparator which has a switching instruction signal inputted to compare the inputted switching instruction signal with an operating state decision reference voltage signal, the switching instruction signal being produced by a signal generating unit operated by an output voltage of the switching power supply circuit, and outputs a switching decision signal indicating whether the switching instruction signal is a signal instructing a stand-by operation or not;

a decision circuit which is connected to the first comparator and the second comparator and, after the voltage decision signal outputted from the first comparator indicates that the output voltage of the switching power supply circuit reaches the specified control voltage, makes the switching decision signal outputted from the second comparator effective; and a control circuit which is connected to the decision circuit to operate the switching power supply circuit in a normal state until the output voltage reaches the specified control voltage and, after the output voltage reaches the specified control voltage, operate the switching power supply circuit in an operation state based on the instruction of the switching instruction signal.

In such a switching power supply control circuit, from the first comparator, the voltage decision signal is outputted which indicates whether the feedback signal of the output voltage detecting circuit exceeds the specified control voltage or not, the output voltage detecting circuit detecting the output voltage of the switching power supply circuit. Moreover, from the second comparator, the switching decision signal is outputted which indicates which of a normal state and a stand-by state is instructed by the switching instruction signal produced by the signal generating unit operated by the output voltage of the switching power supply circuit. The decision circuit has the voltage decision signal and the switching instruction signal inputted to output a signal to the control circuit, the signal being a signal instructing a normal operating state until the output voltage of the switching power supply circuit reaches the specified control voltage and thereafter instructing an operating state instructed by the switching instruction signal. This makes the control circuit operate the switching power supply circuit in a normal state until the output voltage of the switching power supply circuit reaches the specified control voltage. After the output voltage of the switching power supply circuit reaches the specified control voltage, the control circuit operates the switching power supply circuit in the operating state instructed by the switching instruction signal.

With the disclosed switching power supply control circuit according to the invention, the disadvantage in the related switching power supply control circuit can be avoided in that the switching power supply control circuit makes an erroneous decision that the switching power supply circuit is in a stand-by mode before an increase in an output voltage at the starting up of the power supply to make the switching power supply circuit impossible to return into a normal mode. As a result, it becomes possible that the switching power supply system can be made to start up stably in an instructed mode at the turning-on of the power supply.

Other features, advantages, modifications, etc. will become apparent to those skilled in the art from the following detailed description of the invention.

BRIEF DESCRIPTION OF THE DRAWINGS

The invention will be described with reference to certain preferred embodiments thereof and the accompanying drawings, wherein.

DESCRIPTION OF THE PREFERRED EMBODIMENTS

Figure 1:
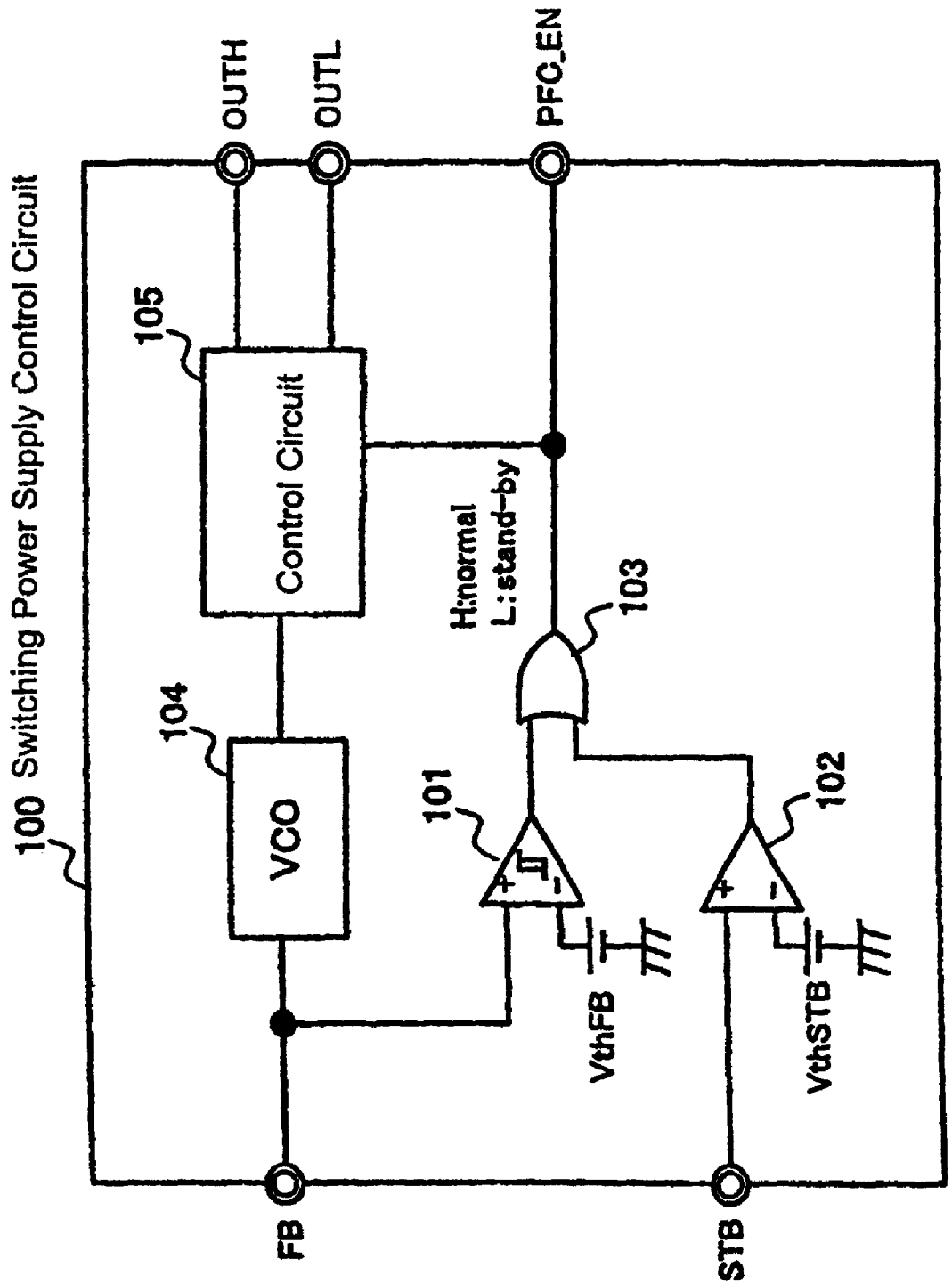
FIG. 1 is a circuit diagram showing a switching power supply control circuit according to a first embodiment of the invention.

FIG. 1 is a circuit diagram showing a switching power supply control circuit according to a first embodiment of the invention. The switching power supply control circuit 100 is included in, for example, the control IC 21 shown in FIG. 6 to form the control IC 21.

The switching power supply control circuit 100 has a first comparator 101 (hereinafter referred to as "comparator 101"), a second comparator 102 (hereinafter referred to as "comparator 102"), a decision circuit 103, a VCO 104 and a control circuit 105. Double circles in FIG. 1 represent input terminals and output terminals. An FB terminal, an STB terminal, an OUTH terminal, an OUTL terminal and a PFC_EN terminal are terminals for inputting a feedback signal of an output voltage detection signal (hereinafter simply referred to as "feedback signal"), for inputting an instruction input signal instructing an operation mode, for outputting a high level output signal, for outputting a low level output signal and for outputting an inner stand-by signal for turning-on and -off the operation of the PFC circuit 11 in the first converter 10 shown in FIG. 6, respectively.

Figure 6:
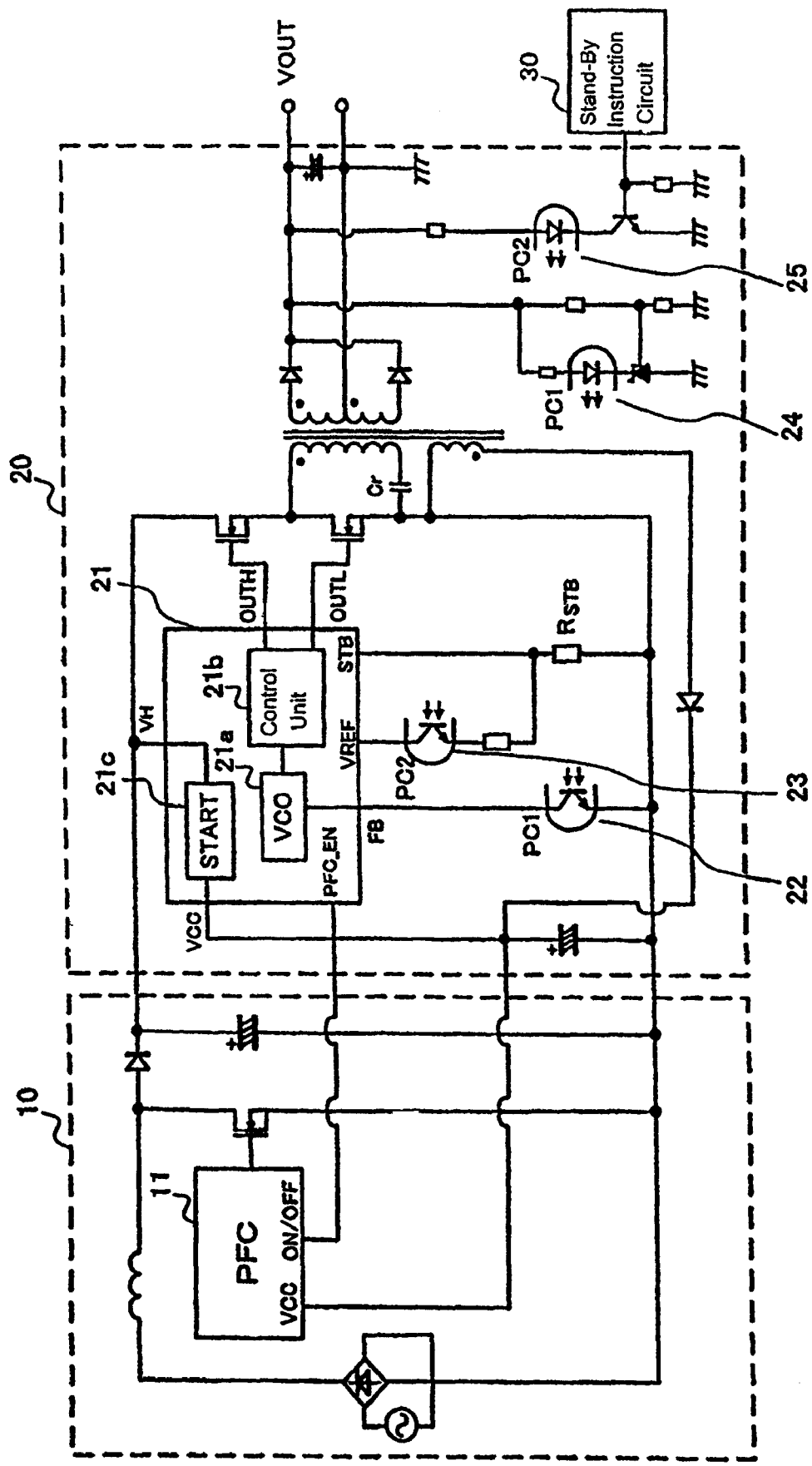
FIG. 6 is a circuit diagram showing an example of a switching power supply circuit forming a switching power supply system.
Figure 7:
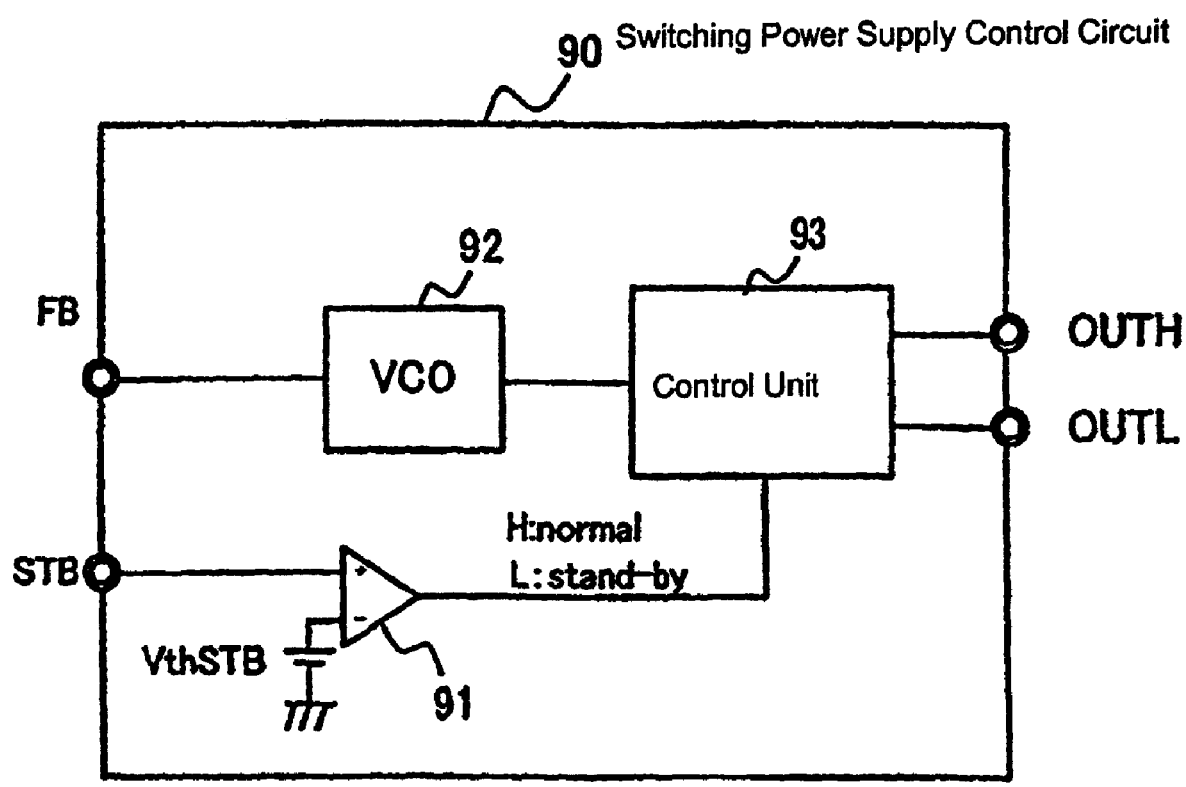
FIG. 7 is a circuit diagram showing an example of a related switching power supply control circuit.
Figure 8:
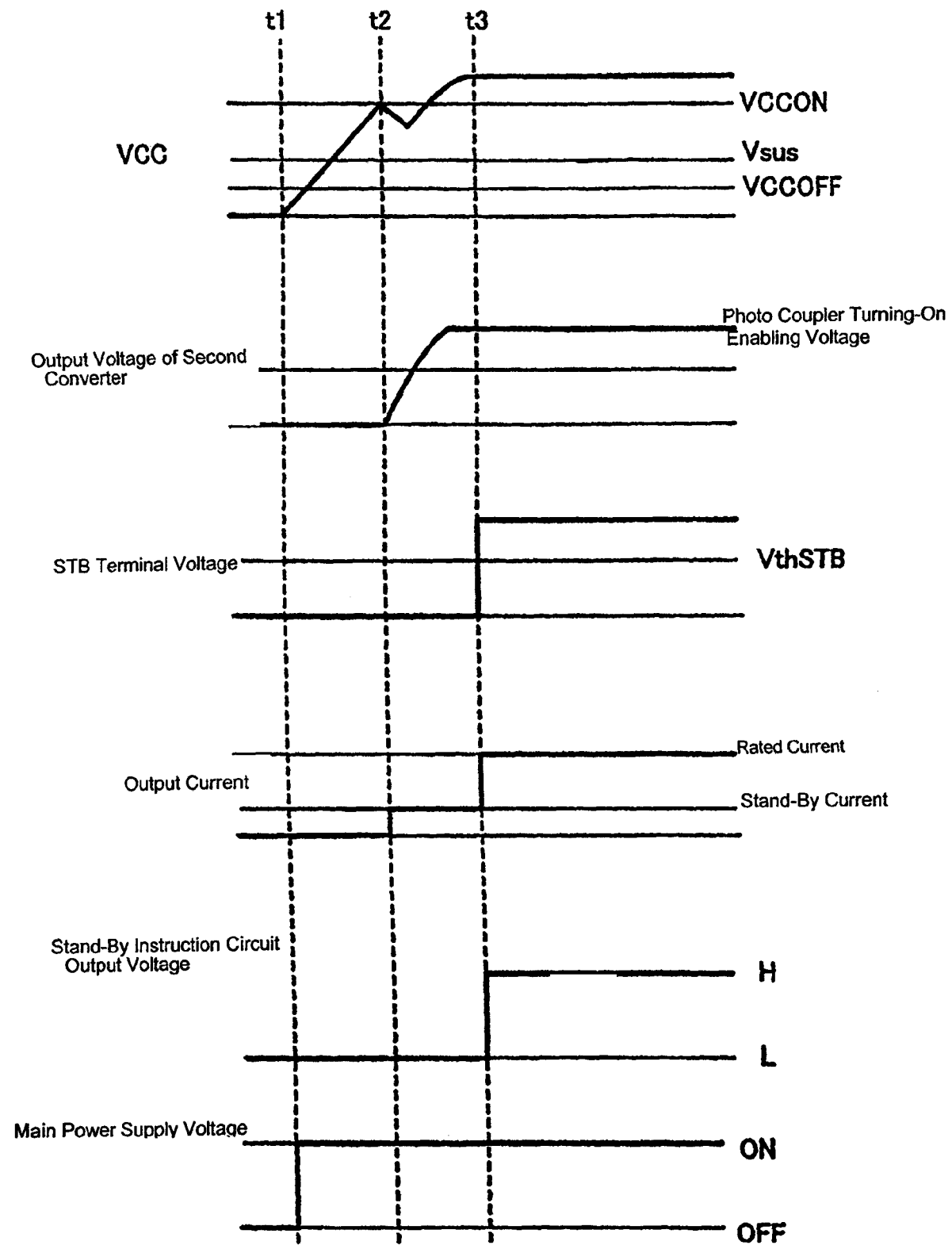
FIG. 8 is a diagram showing variations with time in voltages and currents at various positions in a switching power supply circuit provided with the related switching power supply control circuit shown in FIG. 7 in a starting up operation state in a stand-by starting up mode.
Figure 9:
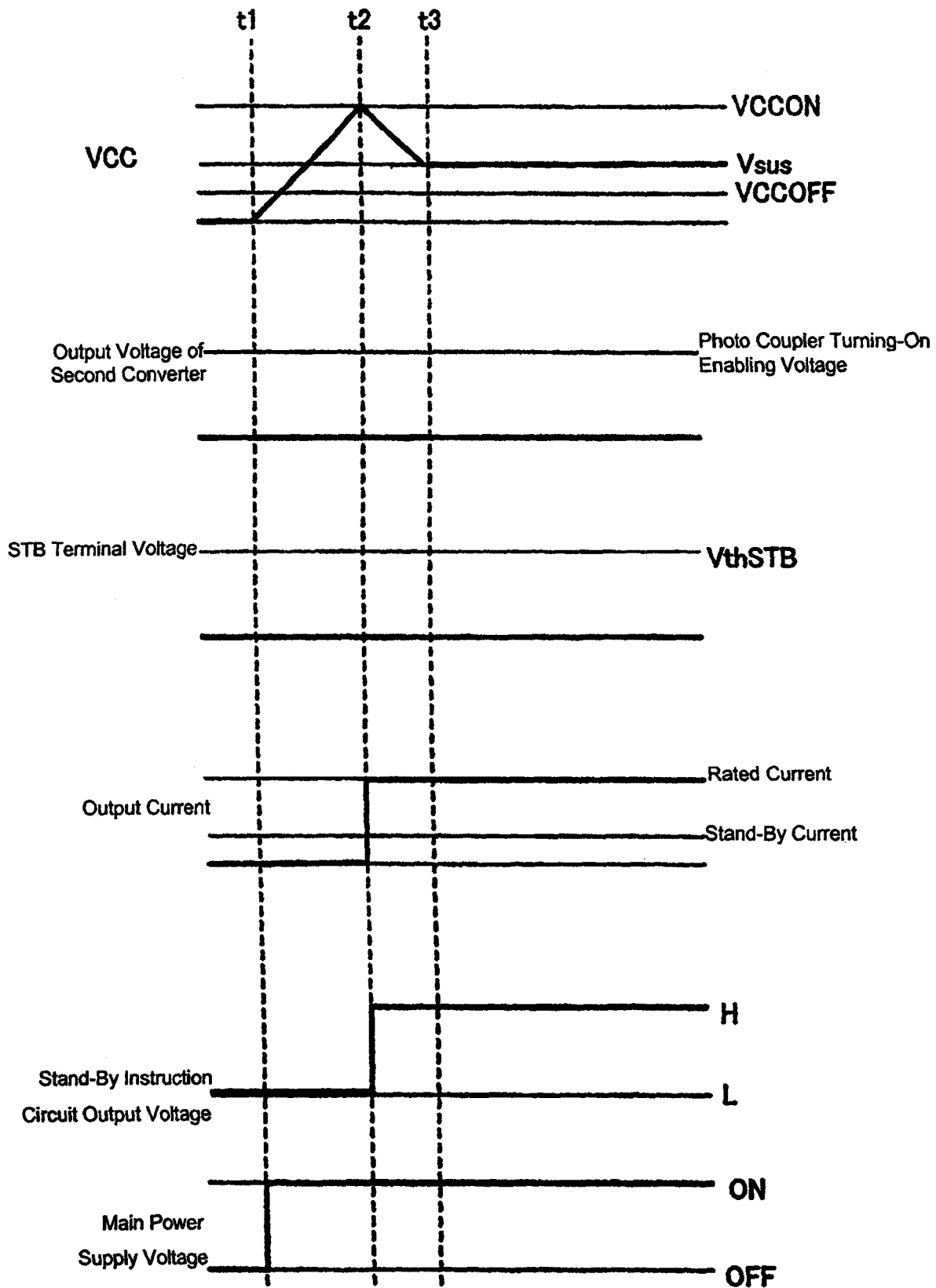
FIG. 9 is a diagram showing variations with time in voltages and currents at various positions in a switching power supply circuit provided with the related switching power supply control circuit shown in FIG. 7 in a starting up operation state in a rated load starting up mode.

The comparator 101 has a feedback signal, inputted through the FB terminal, and a threshold voltage VthFB, corresponding to a specified control voltage, inputted to its input terminals, respectively, with its terminal on the output side connected to the decision circuit 103. For the comparator 101, a comparator with a function exhibiting hysteresis is desirably used for stabilizing its operation mode. At a time at which the switching power supply control circuit 100 is made to start up with a main power source turned-on, the voltage of a feedback signal (FB terminal voltage) is higher than the threshold voltage VthFB. This is because the electric potential of the FB terminal is pulled-up onto the high potential side in the switching power supply control circuit 100 by an element such as a pull-up resistor not shown and the photodetector 22 in the photo coupler PC1 connected to the FB terminal shown in FIG. 6 is made turned-off since no output voltage is raised to cause the light emitting element 24 in the photo coupler PC1 to emit no light. At this time, the output voltage of the comparator 101 becomes an H signal. Then, an increase in the output voltage of the second converter 20 up to the specified control voltage makes the light emitting element 24 in the photo coupler PC1 emit light. This makes the photodetector 22 in the photo coupler PC1 turned-on to cause the voltage of the feedback signal (FB terminal voltage) to become equal to or less than the threshold voltage VthFB. At this time, the output voltage of the comparator 101 becomes an L signal.

The comparator 102 has an instruction input signal instructing an operating mode through the STB terminal and an operation state decision reference voltage (hereinafter referred to as "operation mode decision reference voltage") VthSTB inputted to its two input terminals, respectively. The operation mode decision reference voltage VthSTB is for making decision as to whether the instruction input signal is a signal instructing a normal state (hereinafter referred to as "normal mode") or a signal instructing a stand-by state (hereinafter referred to as "stand-by mode). The terminal on the output side of the comparator 102 is connected to the decision circuit 103. When the stand-by instruction circuit 30 shown in FIG. 6 instructs a stand-by mode with its output voltage provided as an L signal, the light emitting element 25 in the photo coupler PC2 is made turned-off (in a state of emitting no light). This causes the voltage at the STB terminal, varying according to the voltage of the detection signal of the photodetector 23 in the photo coupler PC2 that is to receive the light emitted from the light emitting element 25 in the photo coupler PC2, to be equal to or less than the operation mode decision reference voltage VthSTB. This is because the photodetector 23 in the photo coupler PC2, receiving no light from the light emitting element 25 in the photo coupler PC2, is made turned-off, by which no current is supplied to a resistor RSTB, one end of which is connected to the photodetector 23 in the photo coupler PC2 and the STB terminal, from a VREF terminal connected to a constant voltage source included in the control IC 21 to cause the voltage at the STB terminal to be pulled-down to a low voltage by the resistor RSTB the other end of which is connected to the low voltage side. While, when the stand-by instruction circuit 30 instructs a normal mode, the light emitting element 25 in the photo coupler PC2 is brought into a turned-on state (a state of emitting light). This brings the photodetector 23 in the photo coupler PC2 into a turned-on state to make the voltage at the STB terminal higher than the operation mode decision reference voltage VthSTB. This is because a current flows in the turned-on photodetector 23 in the photo coupler PC2 and the current further flows in the resistor RSTB, by which a potential difference is produced across the resistor RSTB to increase the voltage at the STB terminal. Therefore, the output of the comparator 102 becomes an H signal when a normal mode is instructed as the operation mode and becomes an L signal when a stand-by mode is instructed. However, until the output voltage of the second converter 20 reaches the specified control voltage after the main power supply is turned-on, even though a normal mode is instructed as an operation mode by the stand-by instruction circuit 30, energy enough to make the light emitting element 25 in the photo coupler PC2 turned-on can not be supplied. Therefore, in the period, the voltage at the STB terminal becomes equal to or less than the operation mode decision reference voltage VthSTB, by which the comparator 102 outputs an L signal meaning a stand-by mode.

The decision circuit 103 is formed of a logical sum circuit (OR gate circuit), to the two input terminals of which the output side terminal of the comparator 101 and the output terminal of the comparator 102 are connected, respectively, and the output terminal of which is connected to the control circuit 105 and the PFC_EN terminal. The comparator 103 outputs an H signal when an output of at least one of the comparator 101 and the comparator 102 is an H signal. Specifically, after the main power source switch is turned-on to make the switching power supply control circuit 100 start up its operation, until the output voltage of the second converter 20 reaches the specified control voltage, the comparator 101 continues to output an H signal. This is because the photodetector 22 in the photo coupler PC1 is not made turned-on yet and, as explained before, the electric potential of the FB terminal is pulled-up to the high potential side in the switching power supply control circuit 100 by an element such as a pull-up resistor not shown. Therefore, the output of the decision circuit 103 in the period becomes an H signal that means a normal mode. When the output voltage of the second converter 20 reaches the specified control voltage, the light emitting element 24 in the photo coupler PC 1 emits light to make the photodetector 22 in the photo coupler PC1 turned-on to lower the FB terminal voltage, by which the output of the comparator 101 becomes an L signal. This thereafter makes the output of the decision circuit 103 become the same as the output of the comparator 102 with one of its input terminals connected to the STB terminal the electric potential of which changes according to the instruction of the stand-by instruction circuit 30. Namely, when the output of the comparator 102 is that instructing a normal mode (H signal), the output of the decision circuit 103 becomes the H signal. Moreover, when the output of the comparator 103 is that instructing a stand-by mode (L signal), the output of the decision circuit 103 becomes the L signal.

The VCO 104 controls the oscillation frequency of the switching power supply circuit according to a feedback signal inputted through the FB terminal. The control circuit 105 is connected to the decision circuit 103 and the VCO 104 to control the switching operations of the second converter 20 and the first converter 10 according to the operation mode instruction from the decision circuit 103. Specifically, when the output of the decision circuit 103 is an H signal, the control circuit 105 makes decision that a normal mode is instructed to make the first converter 10 and the second converter 20 carry out a switching operation in a normal mode. Moreover, when the output of the decision circuit 103 is an L signal, the control circuit 105 makes decision that a stand-by mode is instructed to stop the switching operation of the first converter 10 through the PFC_EN terminal and make the second converter 20 operated in the stand-by mode.

An operation sequence at the starting up of the switching power supply control circuit with such a configuration as described in the foregoing will be explained about the case in which the switching power supply control circuit 100 is applied to the switching power supply circuit shown in FIG. 6. First, the operation sequence in the case of the starting up in a rated load starting up mode will be explained and then, the operation sequence in the case of the starting up in a stand-by starting up mode will be explained.

As was explained above, the rated load starting up mode is the starting up mode in the case in which a main power supply is turned-on with a normal mode being selected.

Figure 2:
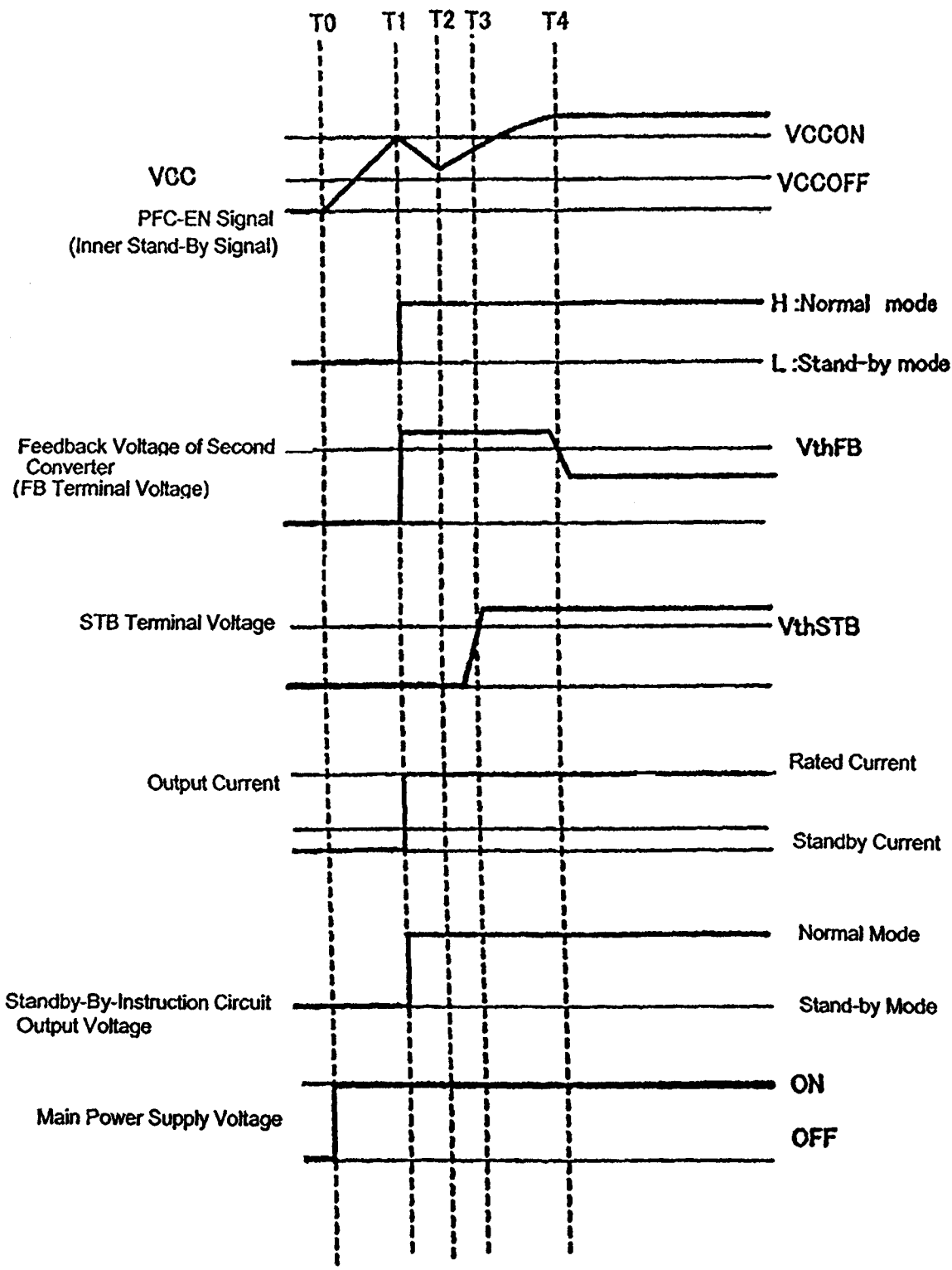
FIG. 2 is a diagram showing variations with time in voltages and currents at various positions in a switching power supply circuit provided with the switching power supply control circuit according to the first embodiment of the invention shown in FIG. 1 in a starting up operation state in a rated load starting up mode.

FIG. 2 is a diagram showing variations with time in voltages and currents at various positions in the switching power supply circuit provided with the switching power supply control circuit 100 according to the first embodiment of the invention shown in FIG. 1 in a starting up operation state in a rated load starting up mode.

Here, the sign VCC represents a VCC voltage inputted to the control IC shown in FIG. 6. A power supply is made turned-on at a time T0 and, at a time T1, with the VCC voltage reached the UVLO on-voltage VCCON, the control IC 21 starts its operation. A PFC_EN signal is equivalent to the output signal of the decision circuit 103 in the switching power supply control circuit 100 shown in FIG. 1 and is outputted from the PFC_EN terminal to the first converter 10. The PFC_EN signal is an inner stand-by signal corresponding to an operation mode in the switching power supply circuit. When the PFC_EN signal is outputted as an H signal, a normal mode is instructed, by which the first converter 10 carries out a switching operation. When the PFC_EN signal is outputted as an L signal, a stand-by mode is instructed, by which the first converter 10 stops the switching operation. The FB terminal voltage is a feedback signal of a detection signal of the output voltage of the second converter 20 shown in FIG. 6, which feedback signal is transmitted through the photo coupler PC1. The STB terminal voltage is an instruction input signal of an operation mode corresponding to the state of the light emitting element 25 in the photo coupler PC2 shown in FIG. 6. The output current is an output current to an external load connected to the second converter 20 shown in FIG. 6. As the output current, a rated current is consumed in a normal mode. While, in a stand-by mode, a stand-by current is consumed. The stand-by instruction circuit output is an output of the stand-by instruction circuit 30 shown in FIG. 6. The output is provided as an H signal in a normal mode, and an L signal in a stand-by mode. The signs T0, T1, T2, T3 and T4 represent times elapsed from the turning-on of the main power supply. The time T0 represents the time at which the main power supply is made turned-on, the time T1 represents the time at which the VCC voltage of the control IC 21 reaches the UVLO on-voltage (VCCON), the time T2 represents the time at which the value of the VCC voltage becomes the minimum below the VCCON with the control IC 21 started its operation, the time T3 represents the time at which The STB terminal voltage exceeds the operation mode decision reference voltage VthSTB and the time T4 represents the time at which the output voltage exceeds the control voltage.

Turning-on (ON) of the main power supply at the time T0 results in an increase in the VCC voltage inputted to the control IC 21. The increased VCC voltage reaches the UVLO on-voltage VCCON at the time T1. During this, the control IC 21 and also the first converter 10 and the second converter 20 are in no operation, by which all of the PFC_EN (inner stand-by) signal, the STB terminal voltage, the output current and the output of the stand-by instruction circuit 30 are provided as L signals. In addition, the electric potential of the FB terminal of the control IC 21 is not pulled-up to a high potential side until the VCC voltage reaches the UVLO on-voltage VCCON. Thus, the FB terminal voltage is also provided as an L signal.

At the time T1, with the VCC voltage reached the VCCON, the control IC 21 starts its operation. At this time, the electric potential of the FB terminal is pulled-up to a high potential side, by which the feedback voltage (FB terminal voltage) becomes higher than the threshold voltage VthFB. This makes the output of the comparator 101 shown in FIG. 1 become an H signal. While, the output of the stand-by instruction circuit 30 shown in FIG. 6 also becomes an H signal that instructs a normal mode. As a result, a rated current is supplied to the load connected to the second converter 20 shown in FIG. 6. However, the output voltage of the second converter 20 is still low at this time to make the light emitting element 25 in the photo coupler PC2 for detecting a stand-by mode still turned-off. Thus, the STB terminal voltage is made to be still an L signal to cause the output of the comparator 102 to be an L signal (equivalent to an instruction of a stand-by mode). Nevertheless, the decision circuit 103, since the output of the comparator 101 is an H signal, outputs an H signal indicating that a normal mode is instructed. Along with this, the PFC_EN signal also becomes an H signal, by which the first converter 10 continues a switching operation.

At the time T1, the VCC voltage reaches VCCON. However, the control IC 21 starting its operation comes to consume a current, by which the VCC voltage decreases to be the minimum at the time T2. At this time, the feedback voltage (FB terminal voltage) is still kept to be higher than the threshold voltage VthFB to be an H signal. Hence, even though the output voltage of the second converter 20 is low to make the light emitting element 25 in the photo coupler PC2 turned-off to make the STB terminal voltage an L signal that causes the output of the comparator 102 to be also an L signal, the output of the decision circuit 103 as the PFC_EN signal continues to be an H signal. Therefore, the first converter 10 receiving the PFC_EN signal also continues its switching operation as being in a normal mode to supply a stepped-up voltage to the second converter 20. This, unlike the starting up in the related switching power supply circuit, even though the switching power supply circuit is in a rated load state, increases the output voltage of the second converter 20. Then, the output voltage increases up to the voltage that allows the light emitting element 25 in the photo coupler PC2 for detecting a stand-by mode to be made turned-on. The turning-on of the light emitting element 25 in the photo coupler PC2, in response to this, makes the photodetector 23 in the photo coupler PC2 turned-on to make the STB terminal voltage also exceed the operation mode decision reference voltage VthSTB at the time T3.

After this, the increase in the output voltage of the second converter 20 close to a control voltage makes the light emitting element 24 and the photodetector 22 in the photo coupler PC1 turned-on to reduce the feedback voltage (FB terminal voltage) to be less than the threshold voltage VthFB at the time T4. At this time, the output of the comparator 101 becomes an L signal. However, the STB terminal voltage, having already exceeded the operation mode decision reference voltage VthSTB deciding an operation mode, makes the output voltage of the comparator 102 kept as an H signal. Therefore, the decision circuit 103 continues to output the H signal instructing a normal mode. After this, an operation in the normal mode is continued until the output of the stand-by instruction circuit 30 becomes an output instructing a stand-by mode.

Figure 3:
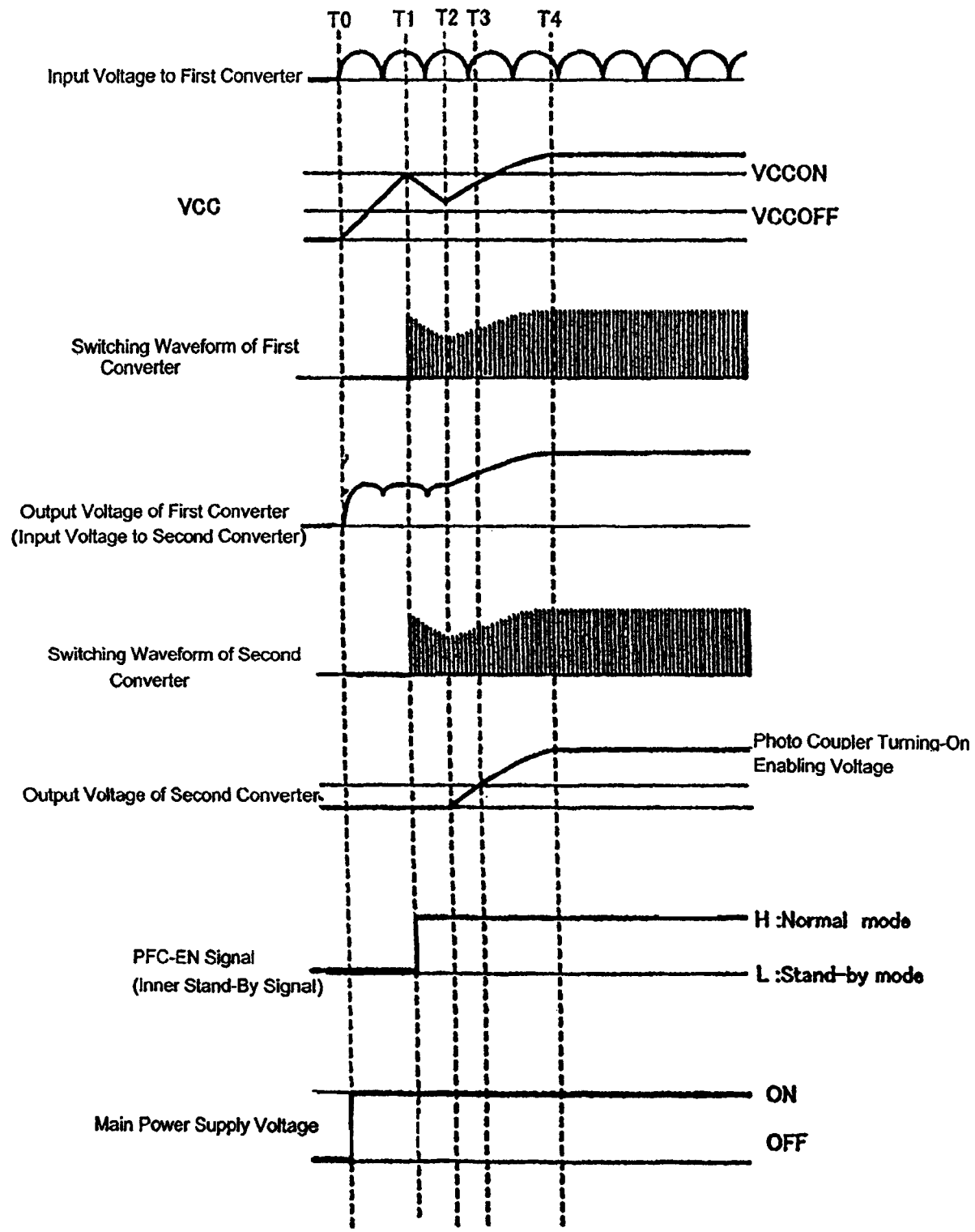
FIG. 3 is a diagram showing variations with time in operation states at various sections in the switching power supply circuit provided with the switching power supply control circuit according to the first embodiment of the invention shown in FIG. 1 in a starting up operation state in a rated load starting up mode.

FIG. 3 is a diagram showing variations with time in operation states at various sections in the switching power supply circuit provided with the switching power supply control circuit 100 according to the first embodiment of the invention shown in FIG. 1 in a starting up operation state in a rated load starting up mode. In the diagram, signs T0, T1, T2, T3 and T4 represent the same times as those shown in FIG. 2. An AC power supply providing the input to the first converter 10 starts supply of energy on turning-on of the main power supply. When the VCC voltage reaches the VCCON at the time T1, the control IC 21 starts an operation. With the PF_EN signal outputted from the control IC 21 taken as an H signal instructing a normal mode, the first converter 10 continues a switching operation. In FIG. 3, the switching waveform of the first converter 10 shows that the switching operation is continuing. This gradually increases the output of the first converter 10, or the input to the converter 20. Moreover, the second converter 20 also carries out an switching operation in the normal mode. In FIG. 3, the switching waveform of the second converter 20 shows that the switching operation is continuing. Thus, the output voltage of the second converter 20 increases to exceed a photo coupler turning-on enabling voltage at the time T3.

At the time T4, the output voltage of the second converter 20 reaches the control voltage. At this time, as shown in FIG. 2, the feedback voltage (FB terminal voltage) becomes less than the threshold voltage VthFB, by which the output voltage of the comparator 101 becomes an L signal. Thus, from the decision circuit 103, an output signal equivalent to the output signal of the comparator 102, namely an operation mode instruction according to the STB terminal voltage is outputted to come to be used for control.

In this way, after the main power supply is turned-on, the switching power supply control circuit 100 certainly operates the switching power supply circuit in a normal mode until the output of the second converter 20 reaches a control voltage. This will be briefly explained in the following. That is, according to FIG. 2, in the period from the time T2 to the time T3, whereas the stand-by instruction circuit 30 instructs a normal mode, the light emitting element 25 in the photo coupler PC2, being made to be turned-off, causes the STB terminal voltage to be an L signal to instruct a stand-by mode. Against this, however, by outputting an H signal from the FB terminal, being kept to be pulled-up to a high potential side due to the similarly turned-off photodetector 22 in the photo coupler PC1, through the comparator 101 and the decision circuit 103 as a PFC_EN signal, an instruction is given so that the switching power supply circuit is made to be in a normal mode in the period. This makes it possible to avoid the disadvantage in that the switching power supply control circuit 100 makes an erroneous decision that the switching power supply circuit is in a stand-by mode before an increase in an output voltage at the starting up of the power supply to make the switching power supply circuit impossible to return into a normal mode.

Subsequent to this, the case in a stand-by starting up mode will be explained. The stand-by starting up mode is a mode in the case in which a stand-by mode is selected at turning-on (ON) of the main power supply.

Figure 4:
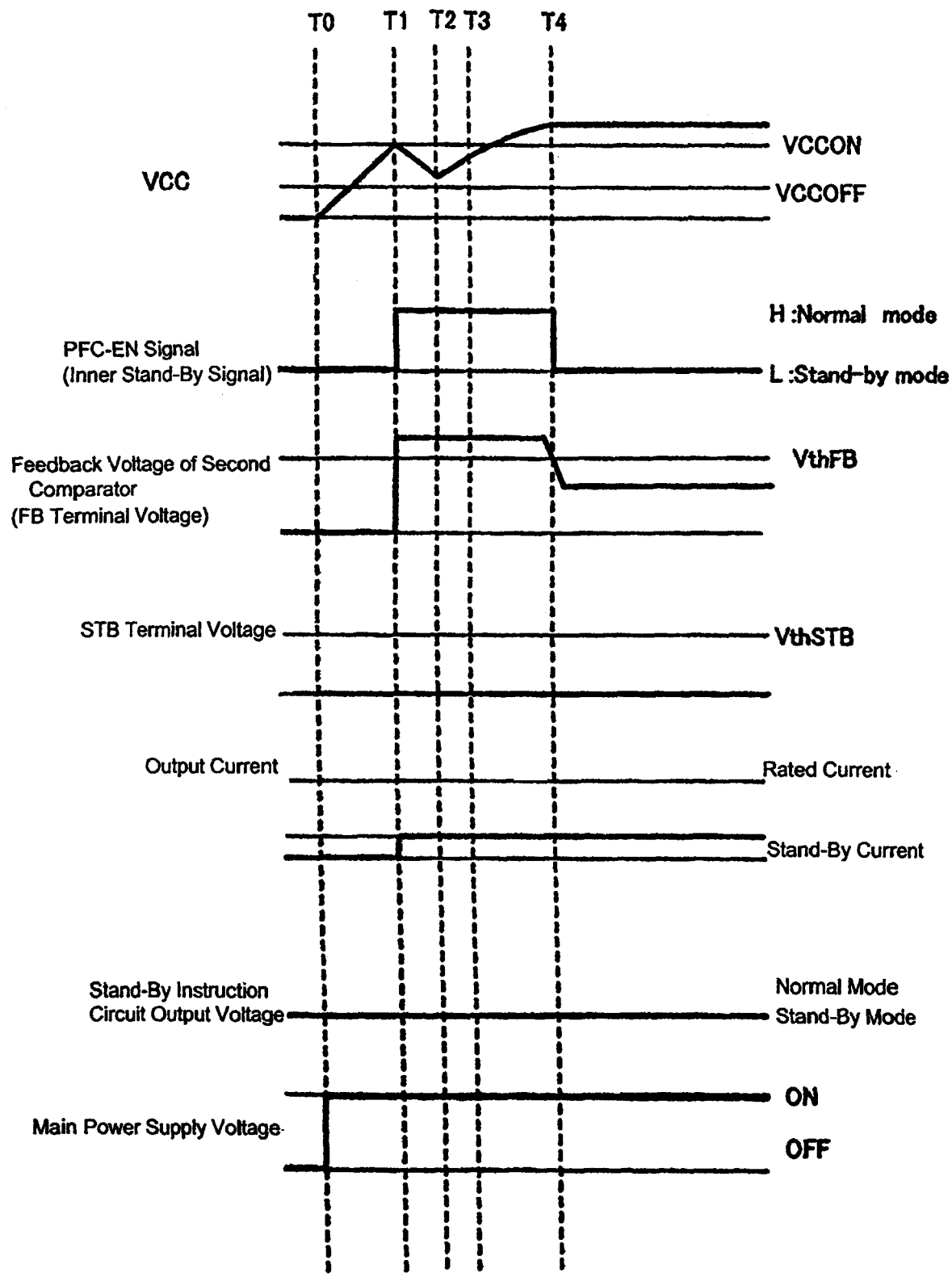
FIG. 4 is a diagram showing variations with time in voltages and currents at various positions in a switching power supply circuit provided with the switching power supply control circuit according to the first embodiment of the invention shown in FIG. 1 in a starting up operation state in a stand-by starting up mode.

FIG. 4 is a diagram showing variations with time in voltages and currents at various positions in the switching power supply circuit provided with the switching power supply control circuit 100 according to the first embodiment of the invention shown in FIG. 1 in a starting up operation state in a stand-by starting up mode. In the diagram, signs T0, T1, T2, T3 and T4 represent the same times as those shown in FIG. 2.

Turning-on of the main power supply at the time T0 results in an increase in the VCC voltage inputted to the control IC 21. The increased VCC voltage reaches the UVLO on-voltage VCCON at the time T1. At the time T1, with the VCC voltage reached the VCCON, the control IC 21 starts its operation. At this time, the electric potential of the FB terminal is pulled-up to a high potential, by which the feedback voltage (FB terminal voltage) becomes higher than the threshold voltage VthFB. This makes the output of the comparator 101 shown in FIG. 1 become an H signal. While, the output of the stand-by instruction circuit 30 shown in FIG. 6 becomes an L signal that instructs a stand-by mode. As a result, a stand-by current is supplied to the load connected to the second converter 20 shown in FIG. 6. In this state, the light emitting element 25 in the photo coupler PC2 for detecting a stand-by mode is still made turned-off. Thus, the STB terminal voltage is made to be still an L signal to cause the output of the comparator 102 to be also an L signal (equivalent to an instruction of a stand-by mode). Nevertheless, the decision circuit 103, since the output of the comparator 101 is an H signal, outputs an H signal indicating that a normal mode is instructed. Along with this, the PFC_EN signal also becomes an H signal, by which the first converter 10 continues its switching operation.

After this, the increase in the output voltage of the second converter 20 close to a control voltage makes the light emitting element 24 and the photodetector 22 in the photo coupler PC1 turned-on to reduce the feedback voltage (FB terminal voltage) to be less than the threshold voltage VthFB at the time T4. At this time, the output of the comparator 101 becomes an L signal. Since the STB terminal voltage is also made to be an L signal being less than the operation mode decision reference voltage VthSTB, the output voltage of the comparator 102 becomes an L signal. Therefore, the output of the decision circuit 103 changes to the L signal instructing a stand-by mode. Therefore, the PFC_EN signal becomes an L signal. After this, an operation in the stand-by mode is continued until the output of the stand-by instruction circuit 30 becomes an output instructing a normal mode.

In this way, within the period from the instant when the switching power supply circuit is made started up by turning-on the power supply to the instant when its output voltage reaches a control voltage, the switching power supply circuit is operated in a normal mode and, when its output voltage reaches the control voltage, the operation is made transferred to that in the instructed operation mode. Thus, it becomes possible for the switching power supply circuit to stably start up even in the case in a stand-by starting up mode.

In the next, a switching power supply control circuit according to a second embodiment will be explained. The difference between the first embodiment and the second is as follows. In the first embodiment, in the period in which the FB terminal voltage exceeds the threshold voltage VthFB, an inner stand-by signal (PFC_EN signal) is made to be an H signal instructing a normal mode. In the second embodiment, however, such a function is made to work only in an initial stage of starting up the power supply.

Figure 5:
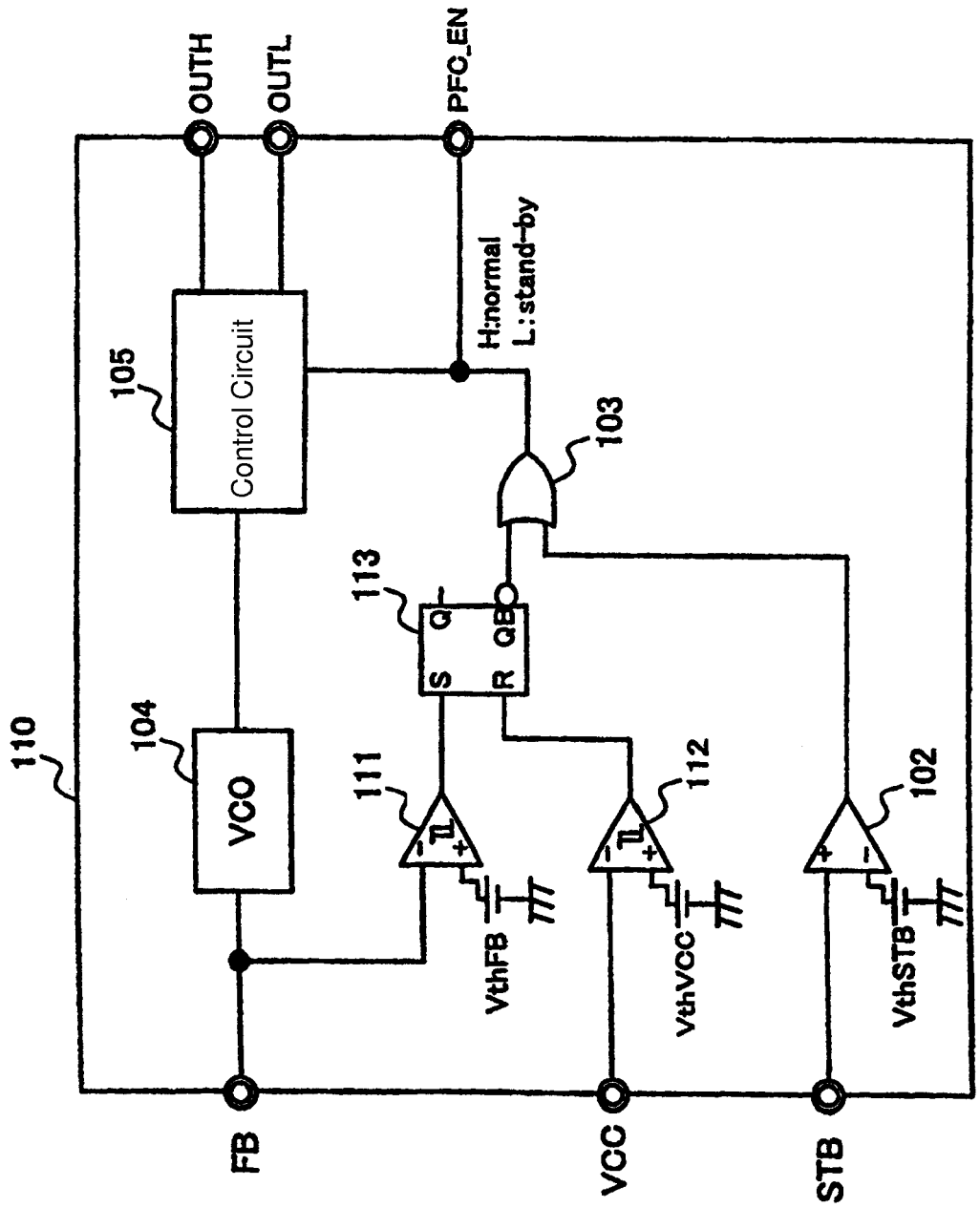
FIG. 5 is a circuit diagram showing a switching power supply control circuit according to a second embodiment of the invention.

FIG. 5 is a circuit diagram showing a switching power supply control circuit according to a second embodiment of the invention. The switching power supply control circuit 110 is also included in, for example, the control IC 21 shown in FIG. 6 to form the control IC 21. The same constituents as those of the switching power supply control circuit 100 shown in FIG. 1 are denoted by the same reference numerals and signs.

The switching power supply control circuit 110 is a circuit additionally having a third comparator 112 (hereinafter referred to as "comparator 112") and a flip-flop circuit (hereinafter referred to as "FF") 113 to the switching power supply control circuit 100 with a comparator 111 placed instead of the comparator 101.

Here, the comparator 111, like the comparator 101 in the switching power supply control circuit 100, has an FB terminal voltage and a threshold voltage VthFB inputted to its two input terminals, respectively, to compare the values of the two voltages. However, the connection for inputting the two voltages to their respective input terminals is reversed to the connection to the input terminals of the comparator 101 shown in FIG. 1. Thus, for a FB terminal voltage exceeding the threshold voltage VthFB, the output of the comparator 111 becomes an L signal and, for that below the threshold voltage VthFB, the output becomes an H signal. Namely, the output is an L signal in the period from the time T1 in FIG. 2 at which the control IC 21 starts its operation to the time T4 at which the FB terminal voltage becomes equal to or less than the threshold voltage VthFB, and thereafter becomes an H signal. However, in case when the FB terminal voltage exceeds the threshold voltage VthFB after the time T4, the output signal sometimes becomes an L signal. The output terminal of the comparator 111 is connected to the FF 113. For the comparator 111, like the comparator 101, a comparator with a function exhibiting hysteresis is better used for stabilizing its operation.

The comparator 112 has a VCC signal inputted to one of its input terminals through a VCC terminal and a threshold voltage VthVCC, corresponding to the VCCON but higher than that, inputted to the other input terminal. The output terminal of the comparator 112 is connected to the FF 113. For the comparator 112, like the comparators 101 and 111, a comparator with a function exhibiting hysteresis is better used for stabilizing its operation. The comparator 112 compares the VCC terminal voltage or a VCC terminal voltage with its level shifted to a low voltage side by a voltage dividing circuit not shown with the threshold voltage VthVCC. When the VCC terminal voltage or the VCC terminal voltage with its level being shifted is lower than the voltage VthVCC, that is, in a period from the turning-on of the main power supply to an increase in the VCC voltage, the output voltage of the comparator 112 becomes an H signal. Then, when the increasing VCC voltage exceeds the threshold voltage VthVCC, the output voltage becomes an L signal.

Here, the threshold voltage VthVCC is set to be higher than the UVLO on-voltage VCCON but lower than the VCC voltage when the feedback voltage (FB terminal voltage) becomes equal to the threshold voltage VthFB.

The FF 113 is an RS flip-flop which functions as a holding circuit holding the output state of the comparator 111 after the FB terminal voltage becomes equal to or lower than the threshold voltage VthFB. To the S terminal and the R terminal on the input side, the output terminal of the comparator 111 and the output terminal of the comparator 112 are respectively connected. An inverted signal from the QB terminal on the output side is is inputted to the decision circuit 103.

As shown in FIG. 2, with a power supply turned-on at the time T0 and with the VCC voltage reached the VCCON at the time T1 to make the control IC 21 start its operation, a feedback voltage (FB terminal voltage) is pulled-up in the control IC 21 to become higher than the threshold voltage VthFB. This is because the output of the second converter 20 is still low at the time T1 to cause both of the light emitting element 24 and the photodetector 22 in the photo coupler PC1 to be made turned-off. At this time, the output of the comparator 111 changes from the H signal to an L signal. Moreover, since the threshold voltage VthVCC is higher than VCCON, at the time T1, the VCC voltage does not reach the threshold voltage VthVCC yet. Thus, the output of the comparator 112 is still the H signal. This makes the L signal and the H signal inputted to the S terminal and the R terminal, respectively, of the FF 113, by which the output from the QB terminal of the FF 113 becomes an H signal until the time T4. Therefore, the decision circuit 103 outputs an H signal until the time T4 regardless of the output of the comparator 102.

An increase in the output voltage of the second converter 20 close to a control voltage makes the light emitting element 24 in the photo coupler PC1 turned-on, by which the photodetector 22 in the PC1 is also made turned-on to reduce the feedback voltage (FB terminal voltage) to be equal to or less than the threshold value voltage VthFB at the time T4. At this time the output of the comparator 111 changes from the L signal to an H signal.

While, the VCC voltage exceeds the VCCON voltage and further exceeds the voltage VthVCC in the period between the preceding time T3 and the time T4. Thus, the output of the comparator 112 has been made inverted from the H signal to an L signal prior to the time T4.

This makes the S terminal and the R terminal of the FF 113 have the H signal and the L signal, respectively, inputted after the time T4, by which the output of the QB terminal becomes an L signal. Therefore, after the time T4, the decision circuit 103, with one of its input terminals connected to the QB terminal of the FF 113, outputs an instruction signal corresponding to the output of the comparator 102.

That is, in the period from the time T1 to the time T4 during which the FB terminal voltage exceeds the threshold voltage VthVCC, the decision circuit 103 outputs an H signal instructing a normal mode. After that, however, the decision circuit 103 outputs an H signal or an L signal instructing a normal mode or a stand-by mode, respectively, according to the output signal of the comparator 102.

In the switching power supply control circuit 110, by means of the FF 113, once an FB terminal voltage becomes equal to or less than the threshold voltage VthFB, the operation mode can be changed according to the STB terminal voltage regardless of the FB terminal voltage thereafter. The other operations are carried out in the same way as those of the switching power supply control circuit 100 shown in FIG. 2 and FIG. 3. Thus, the explanations about the operations will be omitted.

In this way, also in the switching power supply control circuit 110, within the period from the instant when the switching power supply circuit is made started up by turning-on the power supply to the instant when its output voltage reaches a control voltage, the switching power supply circuit is operated in a normal mode and, when its output voltage reaches the control voltage, the operation is made transferred to that in the instructed operation mode. Thus, it becomes possible for the switching power supply circuit to stably start up even in the case in a stand-by starting up mode. Moreover, in the case in which the output voltage once reaches the control voltage to thereby reduce the feedback voltage, switching between a normal mode and a stand-by mode can be carried out according to the STB terminal voltage regardless of the subsequent feedback voltage.

In the explanations of the embodiments, the switching power supply circuit was chosen as that formed of two stages of the first converter 10 and the second converter. However, even though the switching power supply circuit is a DC to DC converter formed of one stage without the first converter 10, the invention can be applied. That is, even though the converter is that carrying out a stop of switching, an intermittent operation or PFM control at a low frequency in a stand-by state, by applying an arrangement the same as those in the two embodiments, the converter can be operated in a normal mode within a period from the instant when the converter is made started up to the instant when an output voltage reaches a control voltage. Thus, an output voltage can be stably raised without making the converter brought into the operation in a stand-by mode in which a stop of switching, an intermittent operation or PFM control at a low frequency are carried out. In each of the embodiments, for the second converter 20, a half-bridge current resonance circuit is taken as an example. The invention, however, can be applied to a power supply circuit of another system such as a flyback system.

Moreover, the measure for transmitting the instruction of a stand-by mode from the output side on the secondary side of the insulating transformer to the circuit on the primary side of the transformer is not limited to a photo coupler. Any measure can be used which can transmit a specified signal from the secondary side to the primary side both of which are insulated from each other. For example, a measure such as a pulse transformer can be used.

While the present invention has been particularly shown and described with reference to the preferred embodiments thereof, it will be understood by those skilled in the art that the foregoing and other changes in form and details can be made therein without departing from the spirit and scope of the present invention.

The application is based on and claims priority to Japanese Application 2008-276776, filed on Oct. 28, 2008. The disclosure of the priority application in its entirety, including the drawings, claims, and the specification therefore, is incorporated herein buy reference.

What is claimed is:

1. A switching power supply control circuit configured to operate a switching power supply circuit so as to be switched into a normal state or a stand-by state, comprising:
a first comparator which has a feedback signal of an output voltage detecting circuit inputted to compare the inputted feedback signal with a feedback reference voltage corresponding to a specified control voltage, the detecting circuit detecting an output voltage of the switching power supply circuit, and outputs a voltage decision signal indicating whether the output voltage of the switching power supply circuit reaches the specified control voltage or not;
a second comparator which has a switching instruction signal inputted to compare the inputted switching instruction signal with an operating state decision reference voltage signal, the switching instruction signal being produced by a signal generating unit operated by an output voltage of the switching power supply circuit, and outputs a switching decision signal indicating whether the switching instruction signal is a signal instructing a stand-by operation or not;
a decision circuit which is connected to the first comparator and the second comparator and, after the voltage decision signal outputted from the first comparator indicates that the output voltage of the switching power supply circuit reaches the specified control voltage, makes the switching decision signal outputted from the second comparator effective; and
a control circuit which is connected to the decision circuit to operate the switching power supply circuit in a normal state until the output voltage reaches the specified control voltage and, after the output voltage reaches the specified control voltage, operate the switching power supply circuit in an operation state based on the instruction of the switching instruction signal.

2. The switching power supply control circuit according to claim 1, wherein the switching power supply control circuit is disposed at a primary side of the switching power supply circuit having the primary side and a secondary side connected with a load, divided by an insulating transformer, and wherein the signal generating unit that generates the switching instruction signal for instructing the normal state or the stand-by state according to a switching instruction from the external is disposed at the secondary side of the switching power supply circuit.

3. The switching power supply control circuit according to claim 1, wherein the first comparator has a hysteresis allowing the voltage instruction signal to be stabilized.

4. The switching power supply control circuit according to claim 1, further comprising a holding circuit holding an output signal state of the first comparator after the output voltage reaches the control voltage, and the feedback signal reaches the feedback reference voltage,
wherein the switching power supply control circuit determines the operation state based on the switching decision signal detected by the second comparator after the output voltage reaches the control voltage.

5. The switching power supply control circuit as claimed in claim 1, wherein the switching determination signal is transmitted to the second comparator from the signal generating unit through a photo coupler or a pulse transformer.

6. The switching power supply control circuit as claimed in claim 1, wherein the switching power supply circuit includes two stage converters of a PFC converter and a DC to DC converter.

* * * * *